United States Patent
Stigwall et al.

(10) Patent No.: US 10,302,745 B2
(45) Date of Patent: May 28, 2019

(54) METHOD AND DEVICE FOR TRIANGULATION-BASED DISTANCE MEASUREMENT

(71) Applicant: HEXAGON TECHNOLOGY CENTER GMBH, Heerbrugg (CH)

(72) Inventors: Johan Stigwall, St. Gallen (CH); Thomas Jensen, Rorschach (CH); Peter Champ, Pinner (GB)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 344 days.

(21) Appl. No.: 15/343,171

(22) Filed: Nov. 3, 2016

(65) Prior Publication Data

US 2017/0123053 A1    May 4, 2017

(30) Foreign Application Priority Data

Nov. 4, 2015   (EP) .................................... 15192952

(51) Int. Cl.
*G01C 3/08* (2006.01)
*G01S 7/481* (2006.01)
(Continued)

(52) U.S. Cl.
CPC ............ *G01S 7/4816* (2013.01); *G01B 11/25* (2013.01); *G01S 7/4814* (2013.01); *G01S 7/4868* (2013.01); *G01S 17/48* (2013.01)

(58) Field of Classification Search
CPC .... G01S 7/4816; G01S 7/4814; G01S 7/4868; G01S 17/48; G01B 11/25
See application file for complete search history.

(56) References Cited

U.S. PATENT DOCUMENTS 5,276,520 A      1/1994  Hawkins et al.
5,905,567 A *   5/1999  Dewan ................. G01B 11/024
                                                                      250/201.6
(Continued)

FOREIGN PATENT DOCUMENTS

DE   10 2004 026 090 A1   12/2005
WO   2007/125081 A1       11/2007
WO   2011/000435 A1       1/2011

OTHER PUBLICATIONS

Decker, S., et al., "A 256×256 Cmos Imaging Array with Wide Dynamic Range Pixels and Column-Parallel Digital Output", IEEE Journal of Solid-State Circuits, vol. 33, Issue 12, Dec. 1998, pp. 2081-2091.
(Continued)

*Primary Examiner* — Samantha K Abraham
(74) *Attorney, Agent, or Firm* — Maschoff Brennan

(57) ABSTRACT

Some embodiments of the invention include a method for determining distances to an object to be measured based on the principle of triangulation, comprising generating and emitting a measuring light beam, directing the measuring light beam to the object to be measured, detecting a reflection of the measuring light from the object with respective pixels of an image sensor during a defined detection sequence ($t_0$-$t_e$) and deriving distance information based on the detected reflection. The detection sequence ($t_0$-$t_e$) comprises a number of at least two exposure sub-sequences each defining a particular exposure period and saturation limit for the pixels of the sensor, wherein a successive exposure sub-sequence comprises a higher saturation limit than its prior exposure sub-sequence and each saturation limit defines a maximum charging level of the pixels for the respective exposure sub-sequence.

20 Claims, 3 Drawing Sheets

(51) Int. Cl.
  *G01S 17/48* (2006.01)
  *G01B 11/25* (2006.01)
  *G01S 7/486* (2006.01)

(56) References Cited

U.S. PATENT DOCUMENTS

2008/0094643 A1 4/2008 Nishio et al.
2013/0176574 A1* 7/2013 Sirat .................. G02B 21/0056
                                                      356/496

OTHER PUBLICATIONS

Yang, D. X. D., and Gamal, A. E., "Comparative Analysis of SNR for Image Sensors With Enhanced Dynamic Range", Proceedings of SPIE, vol. 3649, 1999, pp. 197-211.
European Search Report dated Feb. 3, 2016 as received in Application No. 15192952.8.

* cited by examiner

METHOD AND DEVICE FOR TRIANGULATION-BASED DISTANCE MEASUREMENT

FIELD

The present invention generally pertains to a method and device for structured light triangulation measurement of a surface of an object using an improved detection approach relating to a higher dynamic range of the detector and to an adjusted generation of measuring light.

BACKGROUND

It is common practice to inspect work pieces subsequent to production on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device.

In a conventional 3-D coordinate measurement machine, a probe head is supported for movement along three mutually perpendicular axes (in directions X, Y and Z). Thereby, the probe head can be guided to any arbitrary point in space of a measuring volume of the coordinate measuring machine and the object is measurable with a measurement sensor (probing unit) carried by the probe head. Such probing unit can be designed as a tactile probe or an optical sensor providing measurements of surfaces e.g. based on the principle of triangulation.

In a simple form of the machine a suitable transducer mounted parallel to each axis is able to determine the position of the probe head relative to a base of the machine and, therefore, to determine the coordinates of measurement points on the object being illuminated by the sensor. For providing movability of the probe head a typical coordinate measuring machine may comprise a frame structure on which the probe head is arranged and driving means for moving frame components of the frame structure relative to each other.

An advantage of using an optical sensor is that it is not in contact with the part and therefore does not deform it during the measurement or damage it, as may be the case with a tactile probe.

An advantage of using a line triangulation device in combination with a CMM for measuring a surface is the amount of distance information being received by one time step, i.e. distance values along the entire projected triangulation line can be determined and respective coordinates can be derived. Thus, by moving the sensor along a desired measuring path an object to be measured can entirely be scanned significantly faster.

Over the past 20 years, manually operated portable CMM systems, comprising typically four segments linked together with one or two rotation axes per linkage and a total of six or seven axes, have become popular for non repetitive measurement tasks on the shop floor. Line triangulation device are also used on such portable CMMs to greatly increase data capture speed.

Other portable measurement devices where triangulation units are used include optically tracked systems, either using multiple cameras to track the probe location and orientation or interferometric distance tracking devices, where the rotational axes of the probe are tracked using an additional camera.

Other applications for line triangulation sensors include fixed installations where an object is placed in front of the sensor or sensors and single line measurement(s) of the static object are made such that key features of the part can be captured in a single step without the need for expensive positioning systems.

Furthermore, a device for providing a topographic measurement of a surface can be embodied as a (hand-held) device comprising a triangulation sensor, wherein the device is guided along the surface to be measured—either manually or by a robot—and distance data is acquired by the sensor while moving the device. Additionally, the position and/or orientation of such device may continuously be determined (e.g. tracked) in a global coordinate system thus enabling a determination of absolute coordinates corresponding to the object's surface.

In general, triangulation provides a method for scanning a surface in fast and precise manner. Measuring devices working on that principle are for instance known from DE 10 2004 026 090 A1 or WO 2011/000435 A1.

In particular, a line generated by a laser unit, e.g. by moving a laser point along such line or by providing a laser fan, is generated on an object to be measured and the light reflected from the surface is detected by a camera consisting of a light sensitive image sensor (light detector) and electronics to control the image sensor and read out the image. An image of the reflected light is captured and distance information according to the contour of the detected line is derived. Based thereon, topography of the object's surface can be determined.

For triangulation measurements with high precision, an illumination and detection of respectively reflected light has to be provided which comprises a required level of illumination and an adequate detection of the light information. For adjusting illumination so that the reflected light reaches the detector meeting its respective detection properties (e.g. signal-to-noise level and saturation limit) WO 2011/000435 A1 discloses an approach of an in-advanced illumination in order to determine a suitable illumination level for the measuring light. WO 2007/125081 A1 discloses a further approach for actively controlling the power of illuminating light in dependency upon an intensity detected by a camera.

However, in case of regions to be illuminated which significantly differ regarding their reflecting properties there still remains the problem of providing a usable signal over the whole width of a projected laser line. Particularly, surfaces with low roughness, i.e. mirror-like surfaces such as chrome, are difficult to measure due to strong inhomogenity of the reflected light toward the image sensor. In such cases, a suitable illumination still will reach its limits and, therefore, the precision of derived distance data would be further be low.

Moreover, the precision of laser triangulation is typically limited by the phenomenon of laser speckle. This results in a very strong random amplitude modulation of the image intensity and corresponding random noise in the measurements, also called Probing Dispersion in international standards such as ISO 10360-8.

SUMMARY

Some embodiments of the present invention provide an improved method and triangulation measuring device for enabling an illumination of an object to be measured and a detection of reflected light so that reliable light information can be detected for the entire illuminated region.

Some embodiments of the present invention provide a corresponding measuring device reducing the generation of laser speckles.

Some embodiments of the present invention improve eye-safety, wherein a higher total laser power can be used and faster and more robust measurements, e.g. concerning precision and reliability of those measurements, are enabled.

Laser triangulation sensors typically use a moving spot or a laser fan to measure the 3D location of points along the illuminated line by observing the shift of the line using a camera positioned at a certain baseline distance from the laser plane.

Some embodiments of the present invention relate to a method for determining distances to an object to be measured based on the principle of triangulation. The method comprises generating and emitting a measuring light beam, directing the measuring light beam to the object to be measured, detecting a reflection of the measuring light from the object with respective pixels of an image sensor, e.g. (pixels) of an imaging assembly like a camera, during a defined detection sequence and deriving distance information based on the detected reflection. Of course, in scope of the present invention, the sensor may be designed as an assembly of particular (sub-) image sensors arranged (at different positions) to receive the reflected measuring light. Respective pixels may be pixels provided by the pixels of the entire sensor assembly.

By doing so, the light incident on the object is reflected (or scattered from rough surfaces) and then at least partially received by the image sensor, in particular by respective optics that image the emitted light, e.g. emitted as structured light e.g. in form of a light line, on the sensor. The pixels of the image sensor provide to determine a course of the projected light line on the sensor. Based on the illumination positions at the image sensor (i.e. the imaged course of the line or projected light) distance information along the whole line can be derived which represents topography of the object regarding that line.

According to the invention, the detection sequence comprises a number of at least two exposure sub-sequences each defining a particular exposure period and saturation limit for the pixels of the image sensor. The exposure sub-sequences represent individual detection sequences and in their entirety provide the whole detection sequence. In particular, a first exposure sub-sequence is directly followed by a second such sub-sequence without having a read out and full reset of the image sensor, e.g. without having a break of light detection.

A successive exposure sub-sequence comprises a higher saturation limit than its prior exposure sub-sequence. With other word, the successive exposure sub-sequence is defined so that its allowed saturation level is higher than a respective saturation level of the prior sequence. Each saturation limit defines a maximum charging level of the pixels for the respective exposure sub-sequence, i.e. a maximum allowed charging for each pixel during the respective exposure sub-sequence.

The pixels are at least partly exposed by the reflected measuring light whereby the charge of each exposed pixel changes during exposure. Moreover, the charge of each pixel reaching at least one of the maximum charging levels during the detection sequence (e.g. the saturation limit of an initial exposure sub-sequence during that sequence or the saturation limit of an successive exposure sub-sequence during that successive sequence) is limited or reset according to the respective saturation limit for the period of the corresponding exposure sub-sequences.

Thus the charge of a pixel which reaches or exceeds the defined maximum charging level is kept at the maximum charging level during the respective exposure sub-sequence or is reset at the end of that exposure sub-sequence to that level for providing an ongoing charging with the successive exposure sub-sequence starting from the maximum charging level of the sequence before.

In particular, the exposure periods and saturation limits are defined so that a final total charge for substantially every pixel is below a maximum saturation level defined by a final of the exposure sub-sequences.

That approach allows detecting of the reflected or scattered light from the object surface so that reliable light information is acquired for the entire illuminated and received measuring region. Moreover, complex and slow mechanics of a point-scanner can be avoided while still being able to measure over a large dynamic range.

According to some embodiments of the invention, the measuring light beam is provided by a defined number of light pulses corresponding to the number of exposure sub-sequences of the detection sequence and the exposure sub-sequences and the light pulses are temporally adjusted so that each light pulse is emitted and/or detected during one respective exposure period.

Furthermore, if a high power pulse laser is used, the exposure periods of the exposure sub-sequences can be provided with equal lengths of time, in particular with the shortest time period available with a respective sensor. By that, the duration of the total detection sequence can be set very short thus enabling very fast determination of respective distance information and avoiding the phenomenon of motion-blur. Also, the image sensor's timing quantization may no longer be limiting the maximum dynamic range enhancement since the exposure level of each sub-sequence can be determined by the illumination pulse energy and not by the camera sub-sequence exposure time.

Setting equal durations for the sub-sequence may be done since the minimum sub-sequence-duration of the image sensor may be longer than respective laser pulses to be emitted for sufficient illumination. If the image sensor is designed to provide switching faster between modes or if longer pulses are needed (for instance due a smaller aperture) preferably different durations for respective sub-sequences may be set.

According to a further embodiment, successive light pulses for the detection sequence are generated with decreasing pulse energies, in particular wherein each pulse duration is temporally shorter than the respective sub-exposure period. Such adapted illumination sequence in combination with sequential increase of the pixels' saturation level provides suitable detection of both bright and dark regions of a triangulation light line due to providing a suitable charging level for each pixel.

Generally speaking, according to one approach of the present invention, the detection sequence and the light pulses are designed so that an illumination by the measuring light beam regarding a bright pixel of the image sensor causes a photon (charging) level for the bright pixel below a maximum saturation limit and an illumination by the measuring light beam regarding a dark pixel of the image sensor causes a photon (charging) level for the dark pixel above a defined signal-to-noise threshold.

In context of light detection with a method of above, a respective image sensor may preferably be designed as a high dynamic range (HDR) sensor and in particular provides the sequential saturation increasing sequence. The timings for the respective detection and/or pulsed illumination process may be implemented with an FPGA or similar controller connected to the image sensor or performed by the sensor internally.

Concerning the generation and emission of the measuring light several devices may be provided for that. For instance, the measuring light beam may be generated by a (ordinary) light-emitting diode (LED), in particular comprising a spatial filter, in particular a masking with a slit, for providing a line-like emission of measuring light. Alternatively, the measuring light beam may be generated by a laser source, wherein the measuring light beam is provided as laser beam, in particular by a broad area laser (BAL), a super-luminescent diode (SLED) or a multi-mode laser source.

In context of an embodiment of the invention, a high power laser diode is used, the exposure sub-sequences (camera HDR segment) durations are fixed to the shortest possible (unless this is lower than the maximum laser pulse duration) and the laser pulses of decreasing energy are aligned with the camera HDR segments. Since the total camera exposure time can be very short then, even for large enhancements in dynamic range, motion blur can be neglected. It is to be understood in context of the present invention that exposure durations may be not set to the minimum durations but of course can be set longer if pulses have accordingly longer durations.

By using a broad area laser (BAL) which is "broad"—i.e. greater than ten micrometres—in one lateral direction comprising several transversal modes and aligning this with the direction of the projected laser line it is possible to keep the line well focused while reducing the spatial coherence and thus reduce the laser speckle. Speckle is often the limiting factor for noise in the measurement data and thus limits the probing dispersion error, so this kind of laser improves the precision of each measured point. Another benefit is that the remaining speckle noise is no longer as strongly dependent on the camera aperture, so a small aperture can be used.

Fully coherent laser triangulation devices known from prior art typically use a large camera aperture generating smaller speckles, preferably smaller than the pixel size, to reduce laser speckle influence, thus limiting the depth of field to a thin plane. Thanks to reduced speckle noise and improved eye safety, the present invention also enables laser triangulation devices with small apertures and thus e.g. multiple laser lines or tracking of photogrammetrical targets without introducing excessive speckle noise.

Since BALs are quite wide, they typically have a high power output (e.g. >1 W optically). This feature also combines very well with the small aperture required for multi-line laser triangulation devices in that it allows motion-blur free acquisitions. Furthermore, the short exposure time is also beneficial when using the "multi-slope" HDR mode (providing exposure sub-sequences) in that it again reduces motion blur which may be difficult to handle since the HDR-scheme effects switch between different sensitivities in time and thus produces motion blur which is not the same for the whole image but rather dependent on each pixel's charging level. Also, experiments with current multi-slope HDR image sensors have shown that the shorter exposure time significantly reduces the extra fixed pattern noise introduced by the HDR mechanism.

According to an embodiment of the invention—for emitting the measuring light beam—measuring light is focussed regarding a first direction orthogonal to an emitting direction and the measuring light is diffused regarding a second direction orthogonal to the first direction and to the emitting direction. In particular, a vertically focused and horizontally extended stripe of light is provided.

According to providing a suitable measuring beam, the measuring light beam is generated and emitted with a spatial coherence in the first direction and incoherent regarding the second direction, in particular wherein the measuring light beam comprises one spatial ground mode regarding the first direction and more than one spatial modes regarding the second direction, in particular several transversal modes regarding the second direction. Such beam properties may be generated by respective light forming or by use of a laser source which directly provides such a measuring beam.

A further aspect with view to adequately capturing features relates to an enhanced vertical point density by lateral sub-sampling. To better capture edges near-parallel to the laser line, the image data of the image sensor could be sub-sampled heavily by column or row "skipping" in one direction in order to increase the frame rate so that the most densely sampled lateral direction is no longer along the triangulation line but across it (i.e. in the direction of sensor travel). An additional benefit of this operation mode is that speckle noise from spots offset but overlapping in the baseline-parallel direction is anti-correlated. Thus, the averaged error will diminish faster than the 1/sqrt(N) which would be expected for uncorrelated errors.

According to some embodiments of the invention, a method of above is particularly provided for a triangulation device, i.e. a line triangulation device either working independently e.g. on a production line for in process measurement, or coupled to an automated machine, like a CMM or CNC machine or robot, a manual CMM or located using an optical tracking method as described earlier.

Some embodiments of the invention also relate to a triangulation-based distance measuring unit comprising a light emitting unit with a light source for generating measuring light and emitting a measuring beam, a light detection unit for detecting a reflection of the light beam from an object to be measured (of course more than one light detection unit may be arranged) and a controlling and processing unit for deriving distance information based on the detected reflection. The light source and the light detection unit are arranged with known position and orientation relative to each other.

According to some embodiments of the invention, the light detection unit comprises a high dynamic range (HDR) image sensor providing a light detection sequence with a series of at least two successive exposure sub-sequences each defining a particular exposure period and saturation limit for the pixels of the image sensor. A successive exposure sub-sequence comprises a higher saturation limit than its prior exposure sub-sequence and each saturation limit defines a maximum (allowed) charging level of the pixels for the respective exposure sub-sequence. The pixels of the image sensor are chargeable according to their exposure to the reflected measuring light so that the charge of each pixel reaching at least one of the maximum charging levels during the detection sequence is limited or reset according to the respective saturation limit for the period of the corresponding exposure sub-sequences.

The triangulation-based distance measuring unit or the controlling and processing unit of the distance measuring unit is in particular designed so that a method of above is executable with the measuring unit.

According to a some embodiments of the invention, the controlling and processing unit is adapted to control triggering the detection sequence and control generating a number of light pulses by the light source corresponding to the number of exposure sub-sequences for the detection sequence, so that the exposure sub-sequences and the light pulses are temporally adjusted so that each light pulse is emitted and/or detected during one respective exposure period. By doing so, an adjusted emitting and receiving of measuring light can be provided by the measuring device so that one light pulse is detected within each exposure sequence and a respective illumination of the pixels is provided as well.

Concerning shaping of the measuring beam, the light emitting unit can comprises a beam forming assembly for providing the measuring beam by affecting propagation of the measuring light emittable by the light source, wherein the beam forming assembly can be arranged and designed so that the measuring light is focussed regarding a first direction (with a large divergence of about 0.4 radians, also called "fast axis") orthogonal to an emitting direction and so that the measuring light is diffused regarding a second direction (with a small divergence of about 0.1 radians, also called "slow axis") orthogonal to the first direction and to the emitting direction.

A sharp laser line may be provided by that, wherein an effective reduction of possibly occurring speckle effects is significantly reduced.

In some embodiments, the beam forming assembly can comprise a cylindrical lens arranged and designed so that the focussing in the first direction is provided by the cylindrical lens and diffusing in the second direction is basically unaffected by the cylindrical lens. The focusing in the first direction could also be performed by shifting the laser collimation lens slightly away from the laser diode so that the light is slightly convergent instead of collimated, thus reducing the need of the separate cylindrical focusing lens. A slight divergence along the second direction due to astigmatism of the laser diode can be accepted.

Moreover, additionally or alternatively, the beam forming assembly may comprise at least one array of cylindrical lenses designed and arranged so that the diffusion in the second direction is provided by refraction properties of the cylindrical lenses of the at least one array and focussing in the first direction is basically unaffected by the at least one array. As illustrated below, a further optical element may be arranged in front of the lenslet array for spreading the laser beam in the second direction and thus providing an improved basis for further diffusing. A wider last diffuser can make the light spatially less coherent, thus reducing speckle noise, and can also improve eye safety by spreading the emitted power over a larger area on the retina in case the user looks directly into the laser fan. In particular, to effectively reduce speckles the last diffuser should at least be similar in width to the camera aperture diameter.

Regarding the used light source, the light source can preferably be designed so that the measuring light is producible with a spatial coherence in the first direction and incoherent regarding the second direction, in particular wherein the light source may be designed so that the measuring light is producible comprising one spatial ground mode regarding the first direction and more than one spatial modes (several transversal modes) regarding the second direction.

More specifically, the light source can be represented by a light-emitting diode (LED), in particular comprising a spatial filter, in particular a masking with a slit. Alternatively, the light source can comprise or is designed as a laser source, wherein the emitted light is provided as laser light and the light beam is a laser beam, in particular as a broad area laser (BAL), a super-luminescent diode (SLED) or a multi-mode laser source.

In case the light source comprises a light-emitting diode or laser source, the light source may further comprise a collimation element having an asymmetric light-emitting aperture, wherein the collimation element is designed so that a length of the light-emitting aperture in the first direction is significantly smaller than in the second direction.

Now again referring to light detection using the HDR-sensor and to the emitting of light by the light source with the measuring device, the exposure periods of the exposure sub-sequences can be adapted to comprise equal lengths of time and/or successive light pulses for the detection sequence are generated with decreasing pulse durations.

In context of the approaches of above, according to an embodiment of the invention, laser power in general or pulse power can be adjusted based on a signal provided by receiving or capturing a respective image with the sensor (detection unit). Additionally or alternatively, exposure time may be controlled also based on the received light information. Such adjustments are performed for optimising properties for capturing a successive image. Moreover, not each successive but each second successive image (or even fewer images) can be used for such power and/or exposure adjustment.

Some embodiments of the invention also relate to a computer program product having computer-executable instructions implemented for executing and controlling determining distances to an object according to a method of above, in particular when run on a processing and controlling unit of a distance measuring unit as described.

BRIEF DESCRIPTION OF THE FIGURES

The method and the device according to the invention are described or explained in more detail below, purely by way of example, with reference to working examples shown schematically in the drawings. Specifically, FIG. 1 shows a working principle of a triangulation device the present invention relates to;

DETAILED DESCRIPTION

Figure 1:
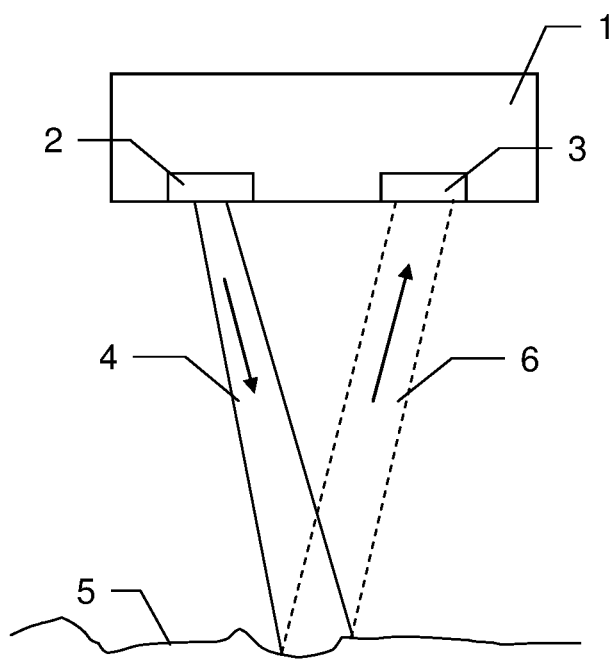

FIG. 1 shows the working principle of a triangulation device 1 according to the invention. The device 1 comprises a light emitting unit 2 and a light receiving unit 3, e.g. a camera, the relative positions and orientations of which are known. In other words, such laser triangulation is to send out light in one known direction from a known position and receive from a known position and measure the angle of the incoming light.

The light emitting unit 2 comprises a light source which may be represented by a laser diode for emitting laser light. Furthermore, the light emitting unit may comprise an optical unit for forming the emitted laser light so that a defined measuring beam 4 can be emitted. Preferably, such measuring beam is focussed according to a first direction (vertically) and diffused with respect to a second direction (horizontally), orthogonal to the first direction. By doing so, a laser line can be produced and projected onto an object 5 to be measured.

The light receiving or detecting unit 3 may comprise an optical assembly (e.g. imaging lens) as well to form and direct the reflected light 6 to an image sensor of that unit. The sensor preferably is designed as a CCD or CMOS sensor providing a pixel-array in form of a line or an area. The sensor is also preferably tilted according to the Scheimpflug criterion so that camera's object plane coincides with the illuminated plane so that all illuminated points are imaged sharply onto the sensor. The image sensor is designed being at least sensitive for light of a wavelength of the measuring light 5. The pixels of the image sensor are exposed by the incoming reflected light 6 and a course of the line at the object 5 can be derived based on the illuminated pixels of the sensor. That allows determining distances to the object's surface based on the knowledge of the relative positions of emitter 2 and detector 3 and the detected line, in particular based additionally on the properties of the optical assembly and the position of the detected line on the image sensor.

According to an alternative embodiment not shown here, the emitted beam 4 is emitted in a direction perpendicular to the housing, allowing to place an additional receiving unit at the left side of the emitting unit 2 in order to generate additional measuring data. There also can be arranged a third receiving unit 3 placed beside the emitting unit 2 at the same distance than the first one (and/or second one) or at different distances to achieve a higher robustness against the detection of objects with a strong contrast change (introducing a shift of the detected intensity centroid) or the detection of edges causing shadowing effects.

By moving the triangulation device 1 over the object 5, continuously receiving the reflected light 6 and processing signals provided by the image sensor, the surface of the object 5 can be measured in its entirety. In particular, such scanning is performed by a coordinate measuring machine (either motorized or hand-held) carrying the triangulation device 1 and moving it along a desired measuring path.

According to the invention, the light emitting unit 2 is controlled so that the measuring light 4 is emitted in pulsed manner and the receiver 3 provides a specific detection sequence for individually detecting reflections caused by each of the emitted pulses. Such detection enables to derive a suitable measuring signal for both bright illuminated pixels and pixels which remain despite their illumination quite dark. The detection process is described in more detail in context of FIGS. 2a and 2b.

For checking if the object 5 to be measured is located within a defined measurement range (relating to a distance between the object and the measuring device) an optical visual guide can be projected within the measuring volume. That optical guide gives information (e.g. to an operator of the system) if the object 5 lies within a preferred measuring region (distance to the measuring device) or not. Such guide could be represented by a line of light being visually receivable and/or having e.g. particular light colour (wavelength) different from the wavelength of the measuring light. Depending on a relative position of that visual guide e.g. in a captured image the location of the object 5 with reference to the measuring range is provided. Such projection can be realised e.g. by illumination of a diffractive hologram as for instance known by the "Flexpoint DOE Series" of the company "Laser Components".

Figure 2A:
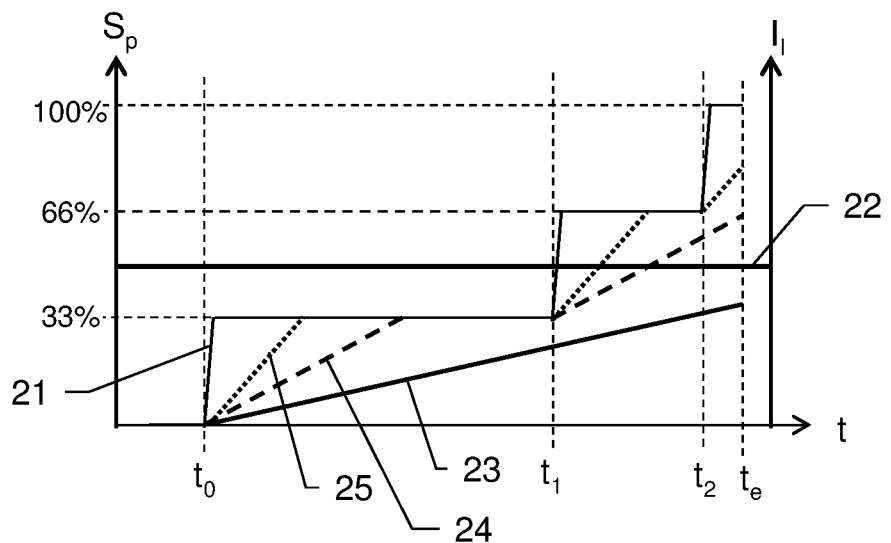
FIGS. 2a-b show methods of emitting measuring light and detecting reflected measuring light for performing a triangulation measurement according to the invention.

FIG. 2a shows a method of emitting measuring light and detecting reflected measuring light for performing a triangulation measurement for triangulation purpose according to the invention with a non-pulsed constant power light source.

The detection sequence for deriving a set of distance information according to a projected laser line starts at time $t_0$. The curve 21 illustrates the controlling of the image sensor, which here preferably is designed as a high dynamic range CMOS (HDR-sensor). As can be seen, the saturation limit $S_p$ for the pixels of the sensor is initially set to 33% of the maximum saturation of the sensor-pixels for an initial exposure period from $t_0$ to $t_1$. That initial exposure period corresponds to a first exposure sub-sequence.

At $t_1$ the saturation level of the sensor-pixels is switched to a higher state, here to 66% of the maximum saturation, and hold for a second time period $t_1$ to $t_2$. The second period is shorter than the initial one. Furthermore, at $t_2$ a third saturation level is applied which corresponds to the maximum allowed saturation of the pixels. The whole detection sequence ends at time $t_e$, wherein a detection signal is provided which represents the illumination of the entire illuminated pixels.

Line 22 represents the illumination intensity of the object to be measured by the measuring unit. Here, the illumination intensity is kept constant over the detection sequence, i.e. a laser line is constantly emitted and directed to the object and reflected measuring laser light is received at the image sensor correspondingly.

The three lines 23, 24 (dashed) and 25 (dotted) represent the charging of three example depicted pixels of the image sensor due to the illumination with constant intensity. The object comprises three example different reflectivities in the areas targeted by the three pixels. The first pixel receives the lowest intensity light, and its charge represented by curve 23 increases quite moderate over time so that the charge of that pixel never reaches one of the defined saturation limits (33% until $t_1$, 66% until $t_2$ and 100% until $t_e$). The final charging level of that pixel at $t_e$ is below the maximum allowed saturation for the pixels and a reliable light information thus is detected by the sensor.

Now referring to the pixel represented by line 24, the charging level of the pixel increases faster compared to 23. Here, the pixel runs into the set saturation (33%) during the initial exposure period. As a consequence the charging level of that pixel is kept limited to the set saturation until $t_1$, i.e. limited to a charging of the pixel up to 33% of a maximum allowed charge. In other words or alternatively, a kind of (partial) reset may be provided for that pixel, the reset affects the charge so that the charging level of the pixel corresponds to 33% of the maximum charge at the end of the first exposure sub-sequence.

As the pixel is still illuminated after $t_1$, and as the saturation limit for the second exposure sub-sequence is increased up to 66%, the pixel (24) proceeds charging with a charging rate corresponding to the slope of the line 24. The saturation limit of the second period is not reached until $t_2$ so there is no further reset or limitation of the pixel's charge. At the end of the detection sequence ($t_e$) also the pixel of line 24 represents a charging state within limits of maximum saturation.

A corresponding limitation or partial resetting is also provided for the pixel receiving light of comparatively greatest brightness represented by line 25, wherein a double limitation (partial reset) occurs due to running into the defined saturation levels of both the first exposure sub-sequence (33%) and the second exposure sub-sequence (66%).

By defining the lengths of time for the exposure periods with decreasing extend as shown, a detection of also quite bright illuminated pixels (25) is reliably provided, as the charge of also the bright pixel (increasing according to the slope of line 25, i.e. according to the amount of light impinging onto the pixel per time) does not run into saturation at least for the final (shortest) exposure sub-sequence.

That detection approach in combination with a measuring beam of constant illumination intensity for the object to be measured provides a detection of all illuminated pixels over a very large dynamic range, enabling accurate distance measurement along the entire laser line even on objects with large differences in reflectance.

Of course, it is to be understood in sense of the present invention that the number of exposure sub-sequences is not limited to three but the invention also relates to detection sequences with at least two exposure sub-sequences, i.e. two or more such sub-sequences. Correspondingly, the definition of the individual saturation limits (33%, 66%) may also vary due to a desired application, the number of sub-sequences and/or the provided light source. The same also applies for the temporal durations of the exposure sub-sequences.

However, the total length of time for the entire detection sequence, i.e. the time between $t_0$ and $t_e$, still can be improved by applying a preferred detection approach according to the invention a shown in the following FIG. 2b. While the total exposure time with the approach described above depends on the image sensor timing resolution, such a limitation is no longer given by use of the approach of FIG. 2b.

Figure 2B:
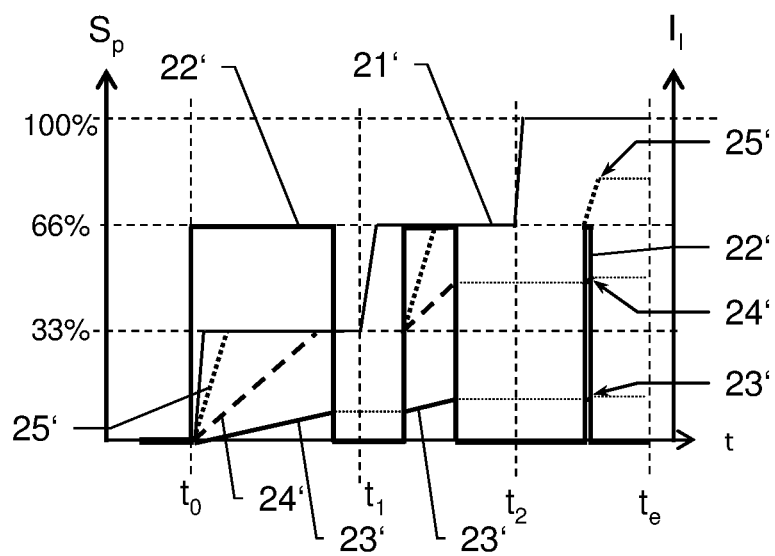

FIG. 2b shows a preferred method of illuminating an object to be measured and correspondingly detecting light reflected from the object according to the invention.

The image sensor used for that approach is preferably designed as a high (wide) dynamic range image sensor (HDR-sensor) having a defined number and constellation of detection pixels. Preferably, the sensor is built as an area image sensor (2D pixel grid).

The controlling of the image sensor, i.e. the duration and timing of three exposure sub-sequences ($t_0$-$t_1$, $t_1$-$t_2$ and $t_2$-$t_e$) and respectively defined saturation limits (33%, 66% and 100%), is represented by the curve 21'. Such exposure properties may directly be provided by an integrated controlling process of the sensor or may be defined by external controlling by an additional controlling unit. Of course, again, it is to be understood that mentioned settings for the exposure sub-sequences are variably definable, wherein at least two sub-sequences are defined according to the invention.

As a difference to the method of FIG. 2a, the exposure periods here are defined to be of substantially equal duration, wherein the time periods are preferably set to be of shortest possible (given by respective sensor properties) duration. Both mentioned limitations are valid as long as this duration is longer than the required laser pulse duration. Or, speaking the other way round, if the sensor provides setting even shorter exposure periods, the duration of each exposure period can be set as short as the duration of a corresponding pulse is. By such an adaptation a significantly shorter overall exposure time $t_0$ to $t_e$ is provided (e.g. of about 100 μs) compared to a setting of the time periods according to FIG. 2a (approximately about 10 ms). As a result, much faster acquisition of distance information with a greater frequency (resolution in time) can be provided which leads to more precise representations of a measured surface. Moreover, the generation of motion blur can be significantly reduces or avoided this way.

In correspondence of setting the exposure sub-sequences like that (of (basically equal) shortest durations) the illumination of the object to be measured is adapted adequately in order of produce measuring data providing reliable and precise pixel information. The way of illumination, i.e. of emitting the measuring light, is shown with curve 22' (course of the illumination intensity $I_l$). In particular, as the exposure sequences are set to be much shorter compared to FIG. 2a the respective amounts of light emitted and received are preferably designed to be significantly higher than in FIG. 2a.

Thus, the measuring light here is no longer emitted in constant manner but is emitted as a pulsed measuring light, preferably as pulsed laser light. The pulses are adjusted so that one pulse is emitted for each exposure sub-sequence. The pulse energies decrease from exposure period to exposure period. For instance the pulse power can be kept basically constant at e.g. the maximum power of the laser diode while decreasing the pulse duration. Alternatively, the pulse durations may be kept constant while reducing the pulse powers. Of course, a combination of both approaches may be applied instead. Such light emitting in combination with the detection sub-sequences provides for charging of slightly and intensely illuminated pixels so that no maximum saturation of respective pixels is reached and suitable pixel information can be derived for each of the pixels.

Therefore, the controlling of pixel's illumination is mainly provided by applying and adjusting the light pulses and keeping the durations of the exposure sub-sequences constant, i.e. of basically equal durations.

The three lines 23', 24' (dashed) and 25' (dotted) represent the charging of three example depicted pixels of the sensor due to the illumination with pulsed measuring light. Curve 23' representing a pixel being of quite low illumination shows a charging of the respective pixel during the illumination in the first period $t_0$ to $t_1$ until the illumination intensity is reduced to zero (i.e. the end of the laser pulse). During illumination by the second pulse (within the second period $t_1$ to $t_2$) the pixel continues charging, starting from the level of the end of the first light pulse (as there is no further charging of the pixel during the period of no illumination, i.e. zero intensity). Furthermore, the charge increases also by emitting the third (shortest) laser pulse so that the final detection signal for that pixel is produced without having a respective saturation.

The same applies for the pixels represented by curves 24' and 25', wherein for those pixel further partial resets or limitations of charging states apply. This is because the pixels illuminations run into respective saturation limits (33% and 66%) set for the first and second exposure sub-sequence. The charging or illumination level for those pixels continues increasing in the successive exposure sub-sequence starting from the preceding saturation limit. Such increase depends on the duration of the respective illumination (pulse duration) and the individual amount of measuring light impinging on the respective pixel per time step (i.e. slopes of the lines 23', 24' and 25').

Such procedure provides a detection of bright pixels (compare pixel represented by curve 25') and dark pixels (curve 23') with one common detection sequence so that none of the pixels runs into a maximum level of saturation (100%) and suitable and detectable pixel brightness is provided at the end to of the detection sequence.

According to an alternative embodiment, for adjusting the illumination amount of light for each exposure sub-sequence, not only the pulse duration but also the pulse power may particularly individually be adjusted.

Figure 3A:
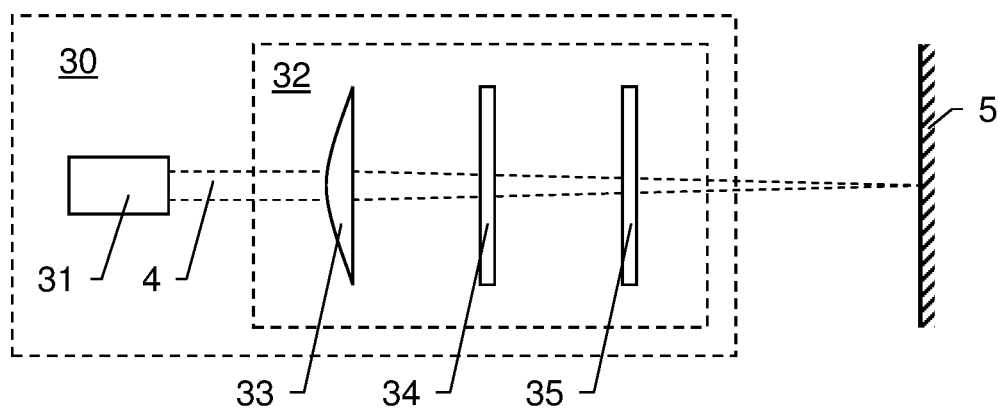
FIGS. 3a-c show a principle of forming measurement light for triangulation measurements according to the invention.
Figure 3B:
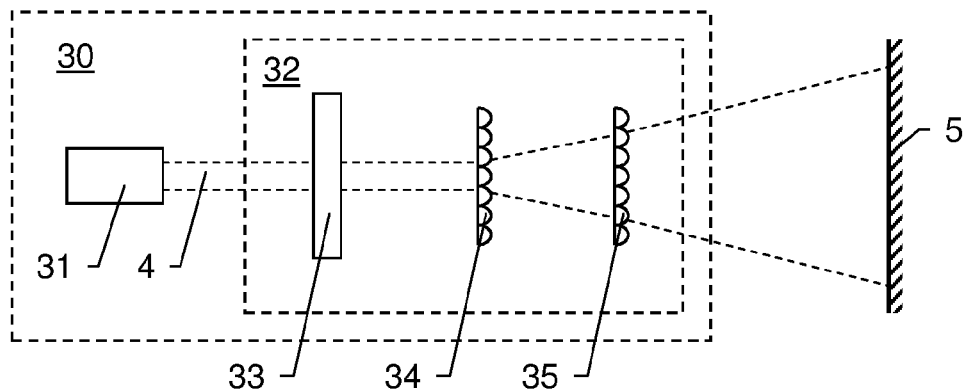

FIGS. 3a and 3b show a principle of forming measurement light for triangulation measurements according to the invention, wherein the measuring light is provided as a laser light beam, in particular for providing high illumination intensities especially for an illumination method according to FIG. 2b.

FIG. 3a shows a side view of a light emitting unit 30 having a laser source 31 and a respective beam forming assembly 32. The laser source 31 here is designed as a broad area laser (BAL) (and a collimation lens).

Broad area lasers (BAL), also known as "broad stripe", "slab" or "broad emitter" laser diodes have a gain volume which is much wider in one lateral direction (here: second or horizontal direction). Compared to single-mode laser diodes which have gain regions which are small in both directions, a BAL emits a very high optical power (in the order of 1-10 W). A BAL can be used in pulsed mode with pulses typically below 100 ns.

In the wide direction, many spatial modes as well as longitudinal modes can coexist. In a narrow direction (here: first or vertical direction), preferably only one spatial ground mode propagates, and the laser can thus be focused down to a diffraction limited line focus. Furthermore, BALs are low cost and represent a suitable type of light source for this invention.

The beam forming assembly 32 comprises a cylindrical lens 33 which provides focussing the laser light 4 emitted by the laser source 31 in a first direction (the laser's fast axis, here called the vertical direction) perpendicular to the propagation direction of the laser light. The laser light 4 emitted comprises spatially coherence regarding this first direction. Alternatively, a light source may be used with very small extent as to the vertical direction or comprising an additional optical element which provides a corresponding small extent (e.g. a LED masked by a very thin slit).

The cylindrical lens 33 further allows to transmit the laser light 4 without any substantial influences regarding the beam shape in horizontal direction (perpendicular to the first and the propagation direction).

Thus, one-dimensional (vertical) focussing is achieved using cylindrical optics. The broad area laser output can first be collimated by an aspherical (non-cylindrical) lens aligned and mounted permanently together with the broad area laser source. It is also possible to skip the collimator and use a stronger vertical focussing lens. Due to the strong divergence of the source, it may however more practical to first collimate the light so that further components can be positioned with more space.

In another embodiment of the present invention, the cylindrical lens 33 is omitted. Instead, the vertical focus is obtained by shifting the laser collimation lens forward. This also focuses the beam in the horizontal direction, but this effect can be neglected in comparison with the following horizontal diffusers.

The beam forming assembly 32 further comprises two cylindrical lenslet arrays 34,35 which substantially do not influence beam forming in vertical direction but which are positioned and aligned so that a beam forming in horizontal direction is enabled. Such beam forming in the second direction is shown with FIG. 3b.

FIG. 3b shows the light emitting unit 30 in a top view, wherein beam formation regarding the second (horizontal) direction is illustrated. As mentioned, the influence on the emitted laser light 4 by the cylindrical lens 33 with respect to the second direction can be neglected. However, the micro-lens arrays 34 and 35 affect the laser beam so that an extension of propagation (angle) in a horizontal plane is caused. The cylinder lens arrays do nearly not affect the quality of the vertical focusing. With other words, the laser beam is horizontally (in sense of the second direction or so called slow axis of the laser diode) diffused by interaction with the lenslet arrays 34,35. Diffusing in above context particularly means that each point or small region along a diffuser should illuminate the entire width of the line.

Figure 3C:
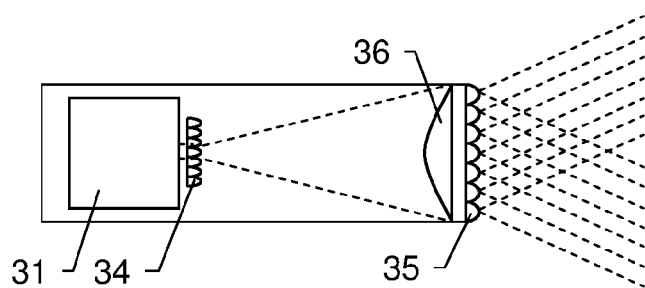

To further enhance the overlap of light emitted from all points on lenslet array 35, a lens 36 with refracting power in the horizontal plane can be added just before or after the lens-array 35 (e.g. a cylindrical lens). This lens preferably has a focal length essentially equal to the distance to lenslet array 34. Such arrangement is shown in FIG. 3c in top view, wherein focussing in the vertical plane is basically provided by the laser source 31 (not shown). Thus, a cylindrical lens 33 as described above is not needed.

Diffusing as mentioned makes it impossible to focus light to one point in eye. Thus, the device provides better eye-safety and, by that, much more laser power can be used for illumination.

It is beneficial to use cylindrical lens arrays e.g. instead of single-surface large lenses since the tolerance on lateral positioning is much less strict. Having two diffusers (e.g. the two lenslet arrays 34,35 as shown) also reduces speckle by in effect converting several transversal modes to spatial incoherence. The first diffuser (which spreads the light to cover the second one) should have a pitch at least around five times smaller than the beam width to reduce effects of lateral positioning.

Furthermore, the array of cylindrical lenses and the light source are preferably designed and arranged so that the measuring beam is emittable in form of a basically continuous line regarding its extension in the second direction. For that, the pitch of the first cylindrical lens array, the width of the laser diode and a laser collimation lens focal length can be chosen so that the projected diode width matches the diffraction angle of the lens array and the emitted line thus becomes continuous without any dark spots which could otherwise occur if the lens array pitch is too fine, the laser width too small or the collimator focal length too long. A too coarse array pitch, wide laser or short collimator focal length could on the other hand cause bright spots where two projections overlap, so it is optimal to choose these parameters exactly so that there is no overlap, or multiples of 100% overlap.

According to a specific embodiment, the configuration comprises one micro-lens array (comparatively small) in combination with a 10 mm exit aperture.

In particular, prior to final diffusion, the laser beam 4 is made "wide enough" to provide a large emitting surface. The initial width of the emitted (and collimated) beam 4 may for instance be about 1 mm in the second direction, while after widening it may be 10 mm at the diffuser 35. Several types of components can be used to widen the emitted beam 4, e.g. a further cylindrical lens, a lenslet array, a diffractive optical element or some kind of computer generated or natural hologram. If the source is a laser without collimation in the horizontal direction (slow axis), the beam may diverge fast enough that no extra optics is needed. The first lenslet array 34 may represent such beam spreading element, wherein the second leanslet array 35 represents the beam diffusing element.

Concerning the used laser diode and a possible focussing collimator, these may comprise asymmetric aperture. The aperture particularly is designed to be as large as possible along the line (to enhance efficiency), i.e. in horizontal direction, and additionally narrower across the line to increase and define depth of focus, as well as to improve focus quality. With a smaller NA it is possible to use a cheaper lens. Moreover, it is difficult to achieve a large depth of focus with only one lens without aperture since it would have to have a very short focal length. A lens with longer focal length with aperture improves pointing stability since magnification from laser position to beam angle is smaller. Since the aperture costs some (e.g. 60%) efficiency, it is beneficial to have a high power laser diode like a BAL.

Figures 4A, 4B:
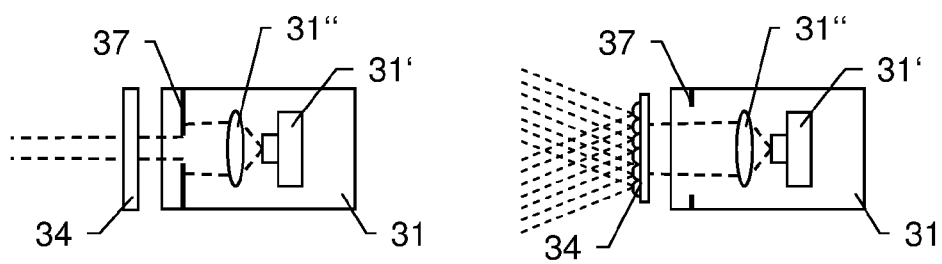
FIGS. 4a-b show an further embodiment of laser source and light forming elements according to the invention.

FIGS. 4a and 4b show an embodiment of the light source 31 according to the invention from different perspectives. FIG. 4a shows the laser source 31 and a lens array 34 in side view. The laser source 31 comprises a laser diode 31' and a (collimation) lens 31". In addition, the laser source 31 comprises an aperture 37 of asymmetric shape. As can be seen in side view, the element 37 comprises comparatively small aperture, e.g. a quite narrow slit for light transmission, for providing large depth of focussing in the first (vertical) direction. Such collimation element 37 further provides a large aperture in the second direction reduce losses for diffusion in the horizontal plane (FIG. 4b). As collimation and spatial limitation of the laser beam with respect to the vertical direction can so be provided in sufficient manner, no further cylindrical lens for focusing is needed.

The focussing of the laser light in the vertical direction and diffusing in the horizontal direction leads to reduction of subjective speckles formation while providing a well defined line which is very suitable for triangulation measurements. Apart from lowering speckle noise and thus improving depth accuracy, the low-speckle illuminator also allows a much increased camera depth of field. The reason for this is that the speckle contrast no longer depends on the camera NA as it does with a fully coherent source.

In addition, relating to detection of the produced laser beam, specific camera optics may be provided with the image sensor. The camera optics may comprise a camera lens which may also have asymmetric aperture since optical resolution along line (horizontally) may be more critical than across. This also results in realising reduced exposure time and thus improves eye safety. Such camera lens may be anamorphic (different magnifications regarding the first and the second direction) to e.g. obtain a wider field of view.

Although the invention is illustrated above, partly with reference to some specific embodiments, it must be understood that numerous modifications and combinations of different features of the embodiments can be made and that the different features can be combined with each other or with triangulation principles and/or coordinate measuring machines known from prior art.

What is claimed is:

1. A method for determining distances to an object to be measured based on the principle of triangulation, comprising:
generating and emitting a measuring light beam,
directing the measuring light beam to the object to be measured,
detecting a reflection of the measuring light from the object with respective pixels of an image sensor during a defined detection sequence, and
deriving distance information based on the detected reflection;
wherein the detection sequence comprises a number of at least two exposure sub-sequences each defining a particular exposure period and saturation limit for the pixels of the image sensor, wherein
a successive exposure sub-sequence comprises a higher saturation limit than its prior exposure sub-sequence and
each saturation limit defines a maximum charging level of the pixels for the respective exposure sub-sequence,
the pixels are at least partly exposed by the reflected measuring light whereby the charge of each exposed pixel changes, and
the charge of each pixel reaching at least one of the maximum charging levels during the detection sequence is limited or reset according to the respective saturation limit for the period of the corresponding exposure sub-sequence.

2. The method according to claim 1, wherein
defining the exposure periods and saturation limits so that a final total charge for substantially every pixel is below a maximum saturation level defined by a final of the exposure sub-sequences.

3. The method according to claim 1, wherein
providing the exposure periods of the exposure sub-sequences with equal lengths of time.

4. The method according to claim 1, wherein
providing the measuring light beam by a defined number of light pulses corresponding to the number of exposure sub-sequences of the detection sequence and
temporally adjusting the exposure sub-sequences and the light pulses so that each light pulse is emitted and/or detected during one respective exposure period, wherein
successive of the light pulses for the detection sequence are generated with decreasing pulse durations, wherein each pulse duration is temporally shorter than the respective exposure period.

5. The method according to claim 1, wherein
the image sensor is designed as a high dynamic range (HDR) sensor and in particular provides the detection sequence.

6. The method according to claim 1, further comprising
focussing measuring light regarding a first direction orthogonal to an emitting direction and
diffusing the measuring light regarding a second direction orthogonal to the first direction and to the emitting direction,
wherein a vertically focused and horizontally extended stripe of light is provided.

7. The method according to claim 1, wherein
generating and emitting the measuring light beam with a spatial coherence in the first direction and incoherent regarding the second direction, wherein the measuring light beam comprises one spatial ground mode regarding the first direction and more than one spatial modes regarding the second direction.

8. The method according to claim 1, wherein
the detection sequence and the light pulses are designed so that
an illumination by the measuring light beam regarding a bright pixel of the image sensor causes a charging level for the bright pixel below a maximum saturation limit, and
an illumination by the measuring light beam regarding a dark pixel of the image sensor causes a charging level for the dark pixel above a defined signal-to-noise threshold.

9. A non-transitory computer program product having computer-executable instructions implemented for executing and/or respectively controlling determining distances to an object according to a method according to claim 1.

10. A triangulation-based distance measuring unit comprising:

a light emitting unit with a light source for generating measuring light and emitting a measuring beam, a light detection unit for detecting a reflection of the light beam from an object to be measured and a controlling and processing unit for deriving distance information based on the detected reflection, wherein the light emitting unit and the light detection unit are arranged with known relative position and orientation to each other, wherein the light detection unit comprises a high dynamic range (HDR) image sensor providing a light detection sequence with a series of at least two exposure sub-sequences each defining a particular exposure period and saturation limit for pixels of the image sensor, wherein a successive exposure sub-sequence comprises a higher saturation limit than its prior exposure sub-sequence, each saturation limit defines a maximum charging level of the pixels for the respective exposure sub-sequence, and the pixels are chargeable according to their exposure to the reflected measuring light so that the charge of each pixel reaching at least one of the maximum charging levels during the detection sequence is limited or reset according to the respective saturation limit for the period of the corresponding exposure sub-sequences.

11. The distance measuring unit according to claim 10, wherein the controlling and processing unit is adapted to control triggering the detection sequence and control generating a number of light pulses by the light source corresponding to the number of exposure sub-sequences for the detection sequence, so that the exposure sub-sequences and the light pulses are temporally adjusted so that each light pulse is emitted and/or detected during one respective exposure period, wherein the exposure periods of the exposure sub-sequences comprise equal lengths of time, and/or successive light pulses for the detection sequence are generated with decreasing pulse energy.

12. The distance measuring unit according to claim 10, wherein the light emitting unit comprises a beam forming assembly for providing the measuring beam by affecting propagation of the measuring light emittable by the light source, wherein the beam forming assembly is arranged and designed so that the measuring light is focussed regarding a first direction orthogonal to an emitting direction, and the measuring light is diffused regarding a second direction orthogonal to the first direction and to the emitting direction.

13. The distance measuring unit according to claim 10, wherein the beam forming assembly comprises a cylindrical lens arranged and designed so that the focussing in the first direction is provided by the cylindrical lens and diffusing in the second direction is substantially unaffected by the cylindrical lens.

14. The distance measuring unit according to claim 10, wherein the beam forming assembly comprises at least one array of cylindrical lenses designed and arranged so that the diffusion in the second direction is provided by refraction properties of the cylindrical lenses of the at least one array and focussing in the first direction is substantially unaffected by the at least one array, wherein the array of cylindrical lenses and the light source are designed and arranged so that the measuring beam is emittable in form of a substantially continuous line regarding its extension in the second direction.

15. The distance measuring unit according to claim 10, wherein the beam forming assembly comprises a collimation lens arranged and designed so that the focussing in the first direction is provided by the collimation lens.

16. The distance measuring unit according to claim 10, wherein the light source is designed so that the measuring light is producible with a spatial coherence in the first direction and incoherent regarding the second direction, wherein the light source is designed so that the measuring light is producible comprising one spatial ground mode regarding the first direction and more than one spatial modes regarding the second direction.

17. The distance measuring unit according to claim 10, wherein the light source comprises a light source selected from the group consisting of:

a light-emitting diode, a laser source, wherein the emitted light is provided as laser light and the light beam is a laser beam, a broad area laser (BAL), a super-luminescent diode (SLED), and a multi-mode laser source.

18. The distance measuring unit according to claim 10, wherein the light source comprises a light-emitting diode having a spatial filter and/or a masking with a slit.

19. The distance measuring unit according to claim 10, wherein the light source comprises a light-emitting diode or laser source, wherein the light source further comprises a collimation element having asymmetric light-emitting aperture, wherein the collimation element is designed so that a length of the light-emitting aperture in the first direction is significantly smaller than in the second direction.

20. The distance measuring unit according to claim 10, wherein the light detection unit additionally comprises a lens, wherein the image sensor is arranged relative to the lens according to the Scheimpflug criterion, in particular considering a predefined illumination plane.

* * * * *